United States Patent [19]
Benes

[11] Patent Number: 5,209,417
[45] Date of Patent: May 11, 1993

[54] APPARATUS FOR BULK LOADING MAGNETIC TAPE

[75] Inventor: Anthony E. Benes, Erie, Pa.

[73] Assignee: Mitchell C. Radov, Erie, Pa.

[21] Appl. No.: 638,217

[22] Filed: Jan. 7, 1991

[51] Int. Cl.⁵ .............................................. B65H 19/26
[52] U.S. Cl. ................................................... 242/56 R
[58] Field of Search ............. 242/56 R; 156/502, 505, 156/506

[56] References Cited

U.S. PATENT DOCUMENTS

| | | | |
|---|---|---|---|
| 3,633,835 | 1/1972 | Beers | 242/57 X |
| 3,787,270 | 1/1974 | King | 242/56 R |
| 3,848,825 | 11/1974 | Zielke | 242/56 R |
| 3,849,661 | 11/1974 | Beiter | 242/75.52 X |
| 4,151,403 | 4/1979 | Woolston | 242/57 X |
| 4,512,904 | 4/1985 | King | 242/56 R |
| 4,535,749 | 8/1985 | Olsson | 242/57 |
| 4,589,608 | 5/1986 | Rehklau et al. | 242/56 R |
| 4,863,110 | 9/1989 | Sakaguchi et al. | 242/56 R |
| 4,994,851 | 2/1991 | Iwai | 242/57 X |

Primary Examiner—John M. Jillions
Attorney, Agent, or Firm—Fay, Sharpe, Beall, Fagan, Minnich & McKee

[57] ABSTRACT

An automatic bulk loading apparatus loads bulk magnetic tape from a cartridge onto an empty cassette of a standard format. The loading apparatus includes a monitoring and control panel for selecting a desired amount of tape to be loaded for particular applications. Both the cartridge and the cassette are oriented to face the operator for ease of use. An automatic control circuit receives information concerning the desired quantity of tape and also monitors the amount of tape loaded onto the cassette. The circuit controls a drive motor in response to these parameters.

30 Claims, 7 Drawing Sheets

APPARATUS FOR BULK LOADING MAGNETIC TAPE

BACKGROUND OF THE INVENTION

This application pertains to the art of bulk loading apparatus and more particularly to apparatus for loading bulk magnetic tape onto an empty cassette. The invention is specifically applicable to loading magnetic video tape from a bulk cartridge onto cassettes for use by commercial and domestic consumers of those products and will be described with particular reference thereto. Currently popular magnetic tape sizes include one-half inch (½") VHS, VHS-C, eight millimeter (8 mm), three-fourths inch (¾") regular, and three-fourths inch (¼") compact, commonly referred to as "U-MATIC" tape. It will be appreciated, though, that the invention has broader applications such as the BETA or D.A.T. formats and other magnetic tape applications.

The recent widespread acceptance of VTR apparatus (video tape recording apparatus), particularly in private homes, has created a large market for blank cassettes of magnetic video tape for sale to consumers. The VHS standard blank cassette is typically loaded with a predetermined quantity of magnetic tape that provides one hundred twenty (120) minutes of recording and playback in standard play (SP) mode, two hundred forty (240) minutes in long play (LP) mode and three hundred sixty (360) minutes in super long play (SLP) mode.. Other video tape standards are similarly sold with a preselected quantity of blank tape that provides recording time at or near the capacity of the cassette.

The proliferation of portable cameras for recording events onto video tape, along with the practice of copying between cassettes using two VTRs or using a single dual-deck VTR, has created a need for blank video cassettes with varying amounts of magnetic tape based upon a particular application. For an event which requires five minutes of tape to record, it is deemed useless and wasteful to employ a standard one hundred twenty (120) minute VHS blank video cassette. A consumer faced with the one hundred twenty (120) minute standard VHS blank cassette, and corresponding similar standards for other formats, is often left with a library of largely blank cassettes, each having abbreviated portions of desired recorded material.

Alternatively, a consumer ends up with a tape having a potpourri of recorded events, oftentimes unrelated. To view a desired event, the consumer may be forced to either watch large portions of extraneous taped material or "fast forward" through undesired material mindful of the counter provided on most standard VTRs. In either situation, the consumer's choices are dictated by the major manufacturers that supply blank cassettes having a predetermined length.

Still another concern is the economic effect of buying tapes having a predetermined recording time and standard tape quality. The consumer still pays full price for a standard cassette whether he ultimately records on the full tape, or just a portion thereof. The situation is worse when the consumer desires a small amount of premium quality tape. Thus, the limited options offered adversely affect the consumer's flexibility and result in increased costs. It has, therefore, been deemed desirable to provide an economical solution that meets the variable needs of the consumer.

SUMMARY OF THE INVENTION

The present invention contemplates a new and improved bulk tape loading apparatus which overcomes the above-referenced problems and provides a consumer with the ability to load blank cassettes with a desired amount of tape from a bulk supply.

According to the present invention, a bulk tape loading apparatus for loading blank magnetic tape from a bulk cartridge onto an empty standard cassette is provided.

According to a more limited aspect of the invention, the apparatus includes a housing for receiving a cassette and a bulk tape cartridge. Means for automatically loading the tape onto the cassette and means for monitoring the amount of tape are disposed between the cassette and cartridge to load a desired amount of tape into the cassette.

According to another aspect of the invention, a splicer is secured to the housing to aid in attaching the tape to leaders provided on the cassette.

According to yet another aspect of the invention, the monitoring means includes control means for metering out selected increments of tape.

According to a still further aspect of the invention, the apparatus includes a counter means for displaying the amount of tape loaded into the cassette.

A primary advantage of the invention resides in the ability to load selected lengths of blank magnetic tape into a cassette.

Another advantage of the invention is found in the convenient arrangement of a housing that receives a bulk tape dispenser and empty cassette, control means and splicer.

Still another advantage of the invention is realized by the cost savings to the consumer.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Referring now to the drawings, wherein showings are for purposes of illustrating the preferred embodiments of the invention only and not for purposes of limiting same, the FIGURES show a bulk magnetic tape loading apparatus A that receives a bulk magnetic tape cartridge or dispenser B and cassette C. A monitoring or control means D provides for operator control and display of the amount of magnetic tape fed from the cartridge B to the cassette c. A splicing/cut off mechanism E may also be included on the housing to facilitate attachment of the tape to conventional tape leaders associated with the cassette.

Figure 1:
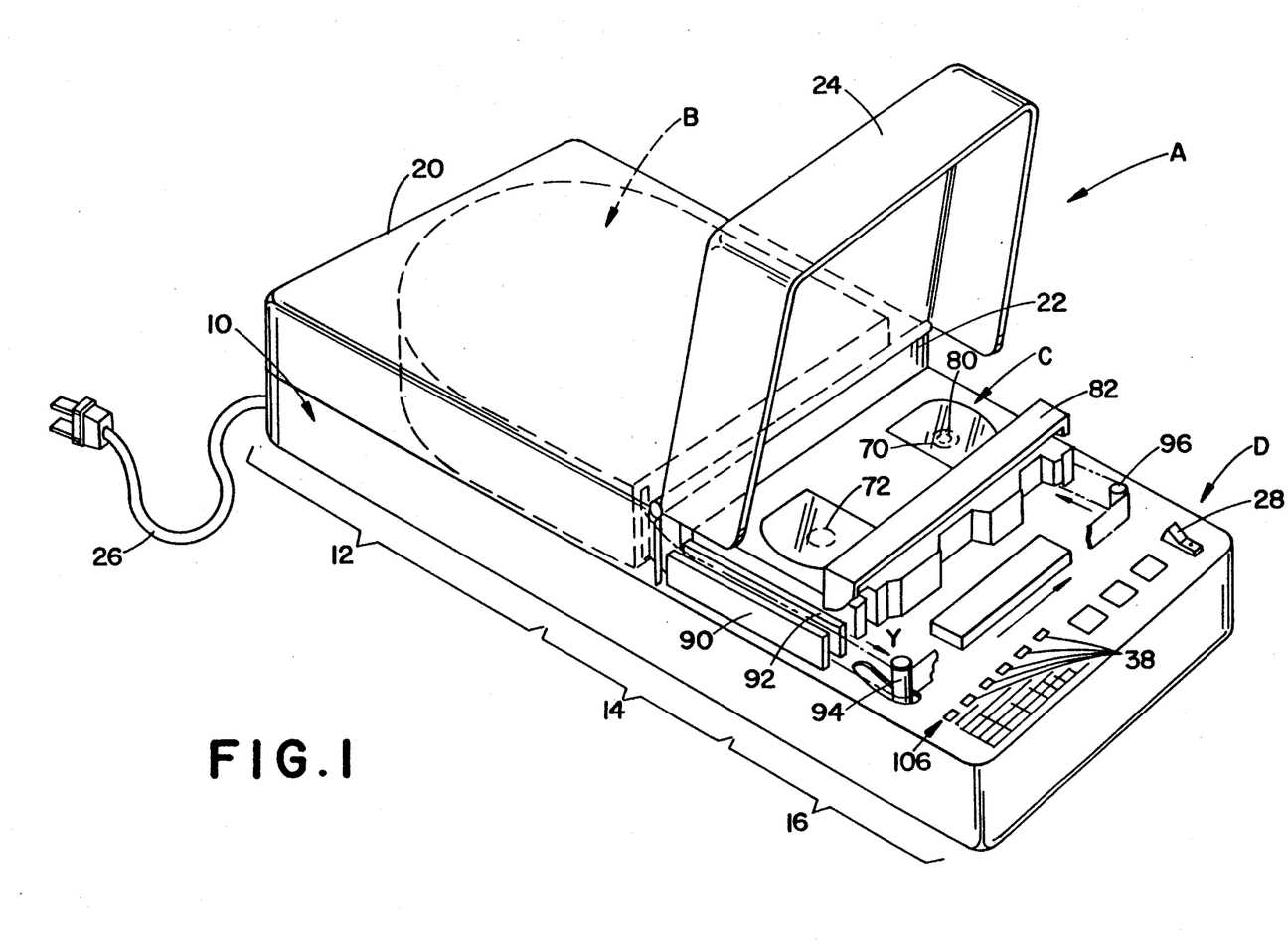
FIG. 1 is an isometric view of the subject invention showing a bulk magnetic tape loading apparatus adapted to receive a blank cassette.

More particularly with reference to FIG. 1, the bulk magnetic tape loading apparatus A has a housing or base portion 10 generally divided into three regions 12, 14, 16. The first region is sized to receive the bulk tape cartridge B, the second region 14 receives the cassette 0, and the third region generally defines the monitoring and control means for controlling operation of the bulk loading apparatus. A first access door 20 is pivotally secured along hinge wall 22 to the housing. Likewise, a second access door 24, shown in its opened position, is pivotal about the common hinge wall 22. Alternatively, the second door may be attached to the housing 10 at a different location if desired. A power cord 26 supplies A.C. power to an internal electric motor (not shown) and control circuitry when power switch 28 is toggled to its ON position. As a further feature, the power switch 28 may be illuminated to visually indicate that the apparatus is operative.

Either or both of the access doors 20, 24 are formed of plastic to cover the bulk cartridge and cassette, respectively, during operation. Preferably, the doors are transparent to allow the operator to visually monitor the tape loading of the cassette while simultaneously acting as a safety cover.

Figure 2A:
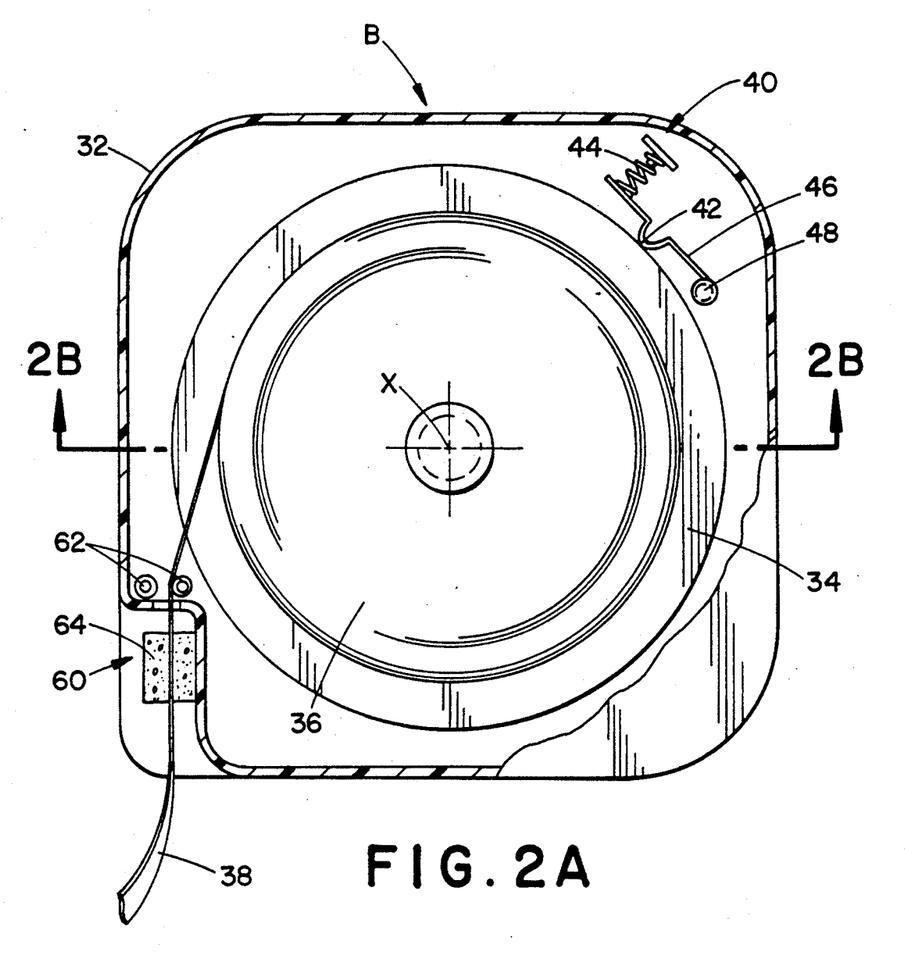
FIGS. 2A and 2B are longitudinal and vertical cross-sectional views of a bulk tape cartridge used in the bulk magnetic tape loading apparatus of FIG. 1.
Figure 2B:
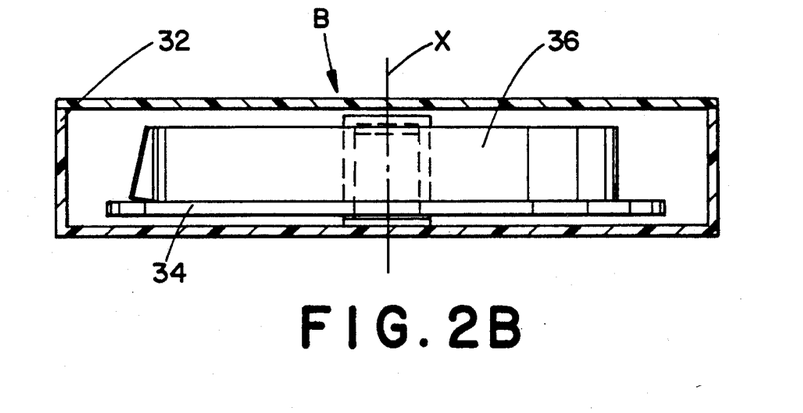

With continued reference to FIG. 1, and additional reference to FIGS. 2A and 2B, details of the cartridge will now be provided. The cartridge B is a substantially closed container 32 provided with a spool 34 rotatable about axis "x". The container and spool are dimensioned to store a large supply of bulk tape 36. For example, a cartridge of the type illustrated having an 8½ inch diameter holds sufficient VHS format tape to record for approximately 13½ hours in Standard Play (SP) mode and 40 hours in Super Long Play (SLP) mode. An end 38 of the tape extends from the cartridge so that the tape may be easily retrieved from the bulk cartridge by a consumer merely by pulling on the tape end.

The cartridge is further provided with a hub lock 40. The hub lock frictionally engages the spool 34 at a lock-spool interface area 42 to prevent the spool from inadvertently rotating during shipping and handling. More particularly, spring 44 urges brake 46 to pivot about pin 48. The brake thereby contacts the periphery of spool 34 and exerts a drag or braking force. Still other braking arrangements may be used without departing from the intent of the subject invention.

The bulk tape cartridge B is also provided with a tape clamp 60 peripherally spaced from the hub lock. The tape clamp preferably includes a roller guide pair 62 and a foam element 64. The roller guide pair directs the bulk tape 36 tangentially from the spool and toward the foam element. The foam element imposes a clamping force on the magnetic tape as it exits the cartridge.

Figure 3:
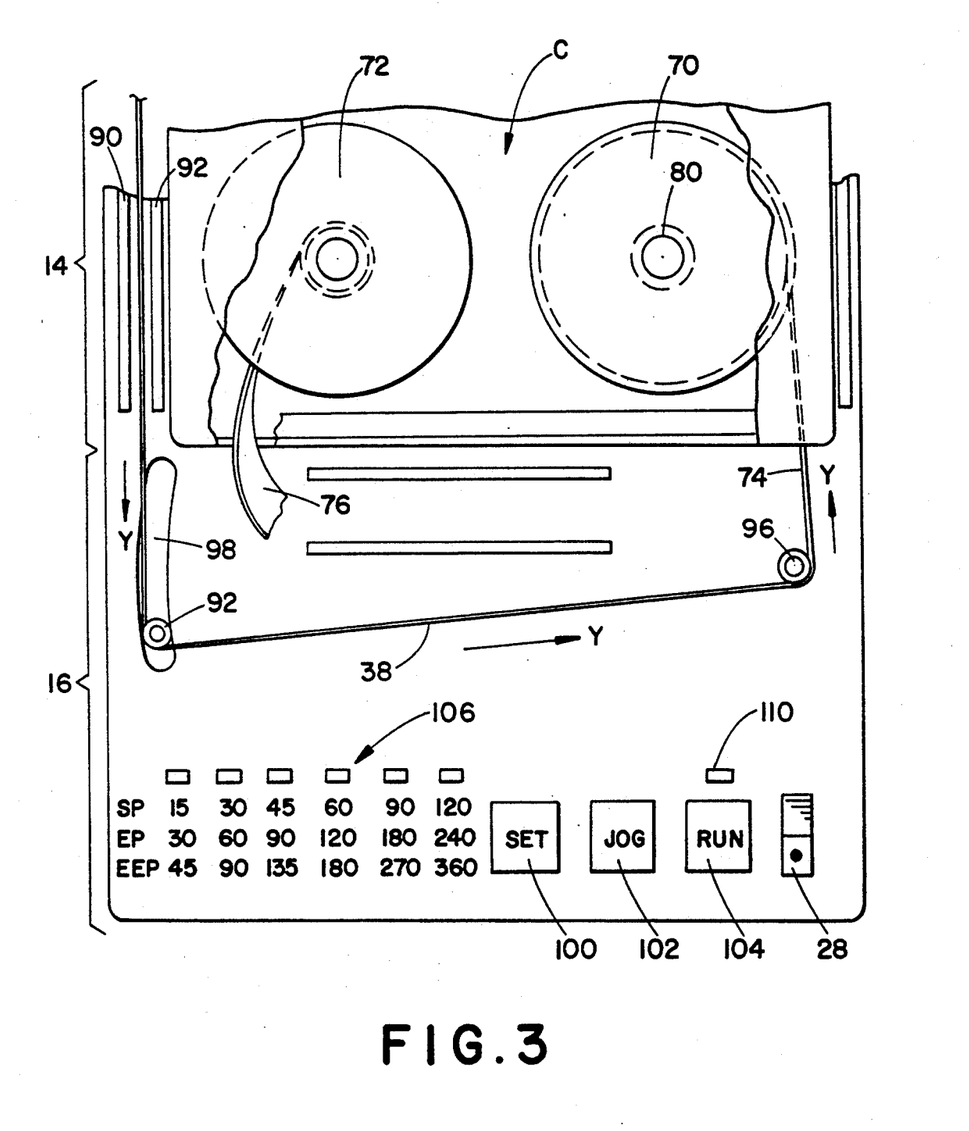
FIG. 3 is an enlarged, detailed view of the control panel of the bulk magnetic tape loading apparatus of FIG. 1.

Referring again to FIG. 1, and additionally to FIG. 3, the second and third regions 14, 16 of the apparatus housing are more particularly shown. The second region receives the cassette 0 beneath the second access door 24. The cassette is typically empty when inserted into the bulk loading apparatus. It does, though, include first and second spools or rods 70, 72 that each have a tape leader 74, 76, respectively, attached thereto in a conventional, known manner. The tape leaders extend from the cassette and are adapted for splicing as will be described in greater detail below.

A drive shaft 80 extends outwardly from the upper surface of the housing second region 14. The shaft is driven by a drive mechanism (not shown) which includes an electric motor contained in the housing. The motor is, in turn, connected to the shaft by gears or a belt, again, in a well known, conventional manner.

The cassette is shown with its bracket 82 in an upright or open position. If desired, the housing second region may be provided with a tab or other mechanism for maintaining the bracket 82 in the open position. As shown, both the bulk tape cartridge B and the empty cassette C are arranged adjacent one another and positioned so that the tape and leaders advantageously face the operator of the loading apparatus who is normally positioned adjacent the monitoring and control means D. Further, the illustrated cassette is VHS style, but may be a VHS-C, eight millimeter (8 mm), three-quarter inch ($\frac{1}{4}$") regular, three-quarter inch ($\frac{3}{4}$") compact, BETA, D.A.T., or any other desired format.

An outer fixed guide 90 and an inner fixed guide 92 are in spaced, generally parallel relation along the left-hand edge of second region 14 and adjacent the cassette. As apparent, the fixed guides are disposed adjacent the lower left-hand corner of the bulk cartridge and adapted to receive the tape end 38 that extends therefrom. The tape proceeds through the guides 90, 92. The pair of fixed guides may be provided with a surface layer of TEFLON, a registered trademark of E.I. Du-Pont de Nemours, or similar smooth material to reduce the effects of friction as the tape passes through the fixed guides. Alternatively, the elongated fixed guides may be replaced by a series of roller guides or other equivalent structure.

The tape continues toward a tensioning roller guide 94, and then a fixed roller guide 96 en route to the cassette. The tensioning roller guide is spring biased in groove 98 toward the position shown to provide for a tight winding of the magnetic tape onto the spool 70 of the target cassette c. If desired, the roller guides 94, 96 may be rotatable to provide for less wear on the magnetic tape during operation of the bulk loading apparatus. In addition, guide 96 may be a capstan for regulating the speed of the tape as it is wound onto the cassette C.

The bulk magnetic tape loading apparatus A also has a series of operator control buttons and indicia in the third region 16 of the housing. In addition to the previously identified power switch 28, there is also included a SET push button 100, a JOG push button 102, and a RUN push button 104. A display gauge 106 is disposed adjacent the control buttons to indicate the amount of tape fed, or to be fed, onto the cassette C The display gauge may be a series of LED's or other indicia reflective of the amount of bulk tape loaded onto the cassette.

In operation, the magnetic tape end 38 is first manually attached to the spool leader 74 for winding onto the first spool 70 of the cassette. The tape end is threaded between the outer and inner fixed guides 90, 92, around the tensioning roller guide 94, and then around the fixed roller guide 96. As the first spool 70 is rotated by shaft so, the tape end 38 attached to the tape leader 74 is unloaded or extracted from the bulk cartridge B and generally follows the tape path illustrated by arrows Y. The tensioning roller guide slides within the tensioning guide groove to take up any slack in the magnetic tape and insures that the tape is efficiently and tightly wound onto spool the 70.

After the tape end is attached to the tape leader 74 of the first spool 7o of the cassette, an operator may energize the loading apparatus using power switch 28. The switch is illuminated indicating that the loader is ready for operation. The operator next uses the JOG push button 102 to slow)y rotate the spool 70, eliminating any slack in the magnetic tape end between the spool 70, the fixed roller guide 96, tensioning roller guide 94 and the foam element 64. Once taut, the operator may terminate the slow rotation of the spool 70 by releasing the JOG push button.

Successive depressions of the SET push button are sensed by internal circuitry within the bulk loading apparatus to establish and store a signal representative of a quantity of tape to be loaded onto the cassette 0. By way of example only, if the SET push button 100 is depressed once, the display gauge will illuminate at the position "15", indicating that fifteen (15) minutes worth of magnetic tape are to be loaded onto the cassette. A second depression of the SET push button causes the display gauge to illuminate at the position "30" indicating that thirty (30) minutes worth of magnetic tape are to be loaded onto the feed spool. Likewise, six successive depressions of the SET push button cause the display gauge to indicate that one hundred twenty (120) minutes of tape are to be loaded onto the cassette. Specifically, all six LED's 108 are illuminated to represent such a condition. Still other time increments or a different number of tape increments may be used without departing from the scope and intent of the subject invention.

Having established an amount of magnetic tape desired to be loaded onto the cassette, an operator next depresses the RUN push button 104, at which time the electric drive motor within the tape loading apparatus engages and begins to rotate the spool 70 via shaft 80 to wind the magnetic tape thereon. RUN lamp 110 reflects this condition of the loading apparatus when lit. As the drive motor rotates the spool 70, a count is maintained by the internal control circuit to determine the amount of tape stored on the cassette. When the counter value reaches a number corresponding to the value stored using the SET push button, a control signal is generated causing the drive motor to stop rotating.

Once the amount of magnetic tape desired to be loaded onto the cassette is so loaded according to the above the operator may easily attach the spool leader 76 to the trailing end of the bulk tape after manually cutting same. The cassette thus loaded must next be rewound in order to provide the end user with a proper starting point at which to begin recording. The apparatus further comprises a second drive means (shown in FIG. 7) for engaging the second rotatable reel 72' when the cassette C' is in position on the housing as shown for the embodiment illustrated in FIGS. 1 and 3. In addition, the tensioning roller guide 94 is useful for tensioning the magnetic tape during progression of the tape for the first reel 70' to the second reel 72' when spliced with the second leader 76' and spooled onto the second reel 72' as the second drive means rotates.

Figures 4A, 4B:
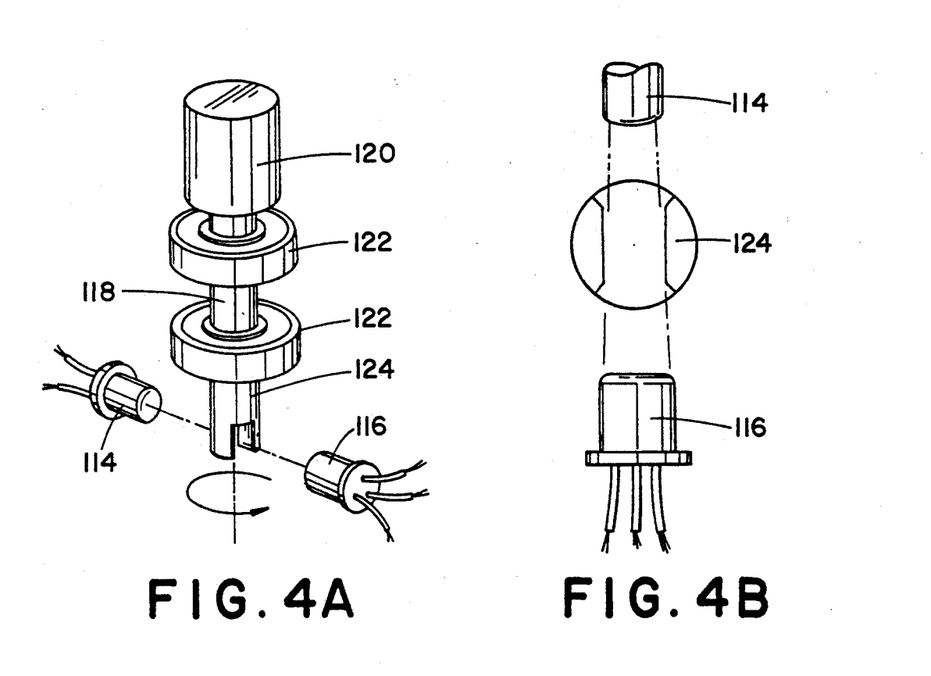
FIGS. 4A and 4B are schematic views showing a preferred mechanism for monitoring the amount of tape loaded onto the empty cassette from the bulk cartridge.

Referring now to FIGS. 4A and 4B, an LED 114 and photo-transistor 116 are used in conjunction with a rotating slotted shaft 118 to count the amount of tape loaded onto the spool 70. The LED emits infrared light and, accordingly, the photo-transistor is sensitive to infrared light. A capstan 120 rotates with the linear progression of the tape onto the cassette spool 7o. As will be understood, the capstan may be a separate element positioned anywhere along the tape path Y, but preferably is incorporated into the fixed guide roller 96. The capstan 120, connected to the shaft 118, is rotatable within spaced bearings 122 so as to cause a slotted end 124 of the shaft to interrupt the light beam from the LED 114 to the photo-transistor 116.

FIG. 4B shows the slotted end 124 positioned to permit the light emitted from the LED to strike the photo-transistor. As the capstan rotates with the linear progression of the magnetic tape, the slotted end selectively interrupts the light beam. This causes a square wave signal to be generated from the phototransistor 116 when connected to appropriate support circuitry. Beginning with the orientation shown in FIG. 4B, the photo-transistor senses four (4) state transitions for a three hundred sixty degree (360°) rotation of the capstan.

Figure 5:
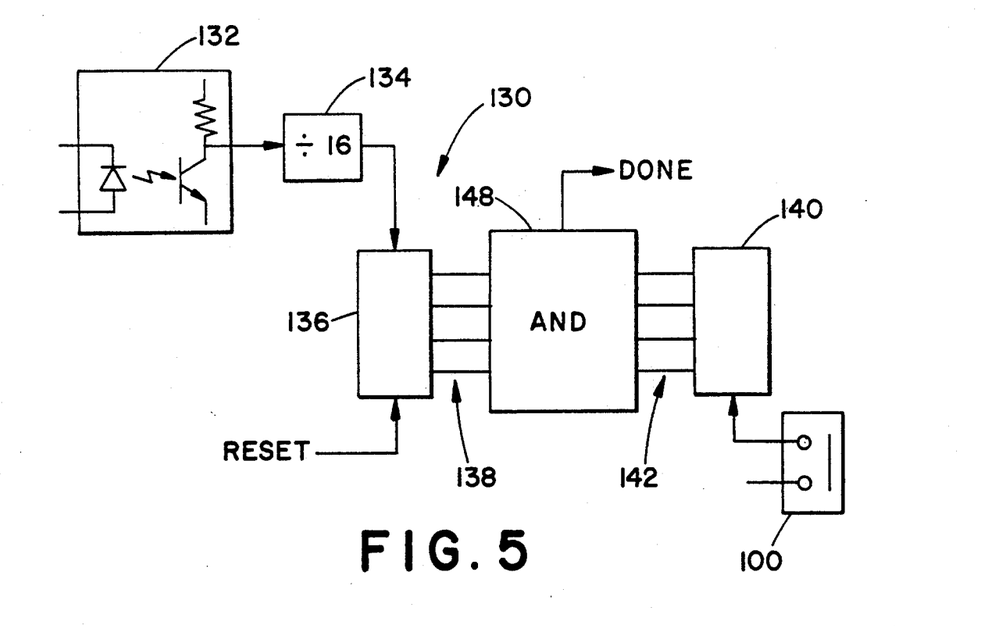
FIG. 5 is a schematic of a counter circuit for counting the amount of tape loaded onto the empty cassette.

Turning now to FIG. 5, the control circuit 130 of the loading apparatus is illustrated. An opto-isolator 132 receives signals from the photo-transistor 116 and support circuitry to generate an equivalent but isolated signal to a divide-by-sixteen counter 134. The divide-by-sixteen counter generates one logic transition for every sixteen logic transitions inputted from the opto-isolator. A counter 136 counts logic transitions outputted by the divide-by-sixteen counter and generates a signal on signal lines 138 representative of the number of logic transitions outputted by the divide-by-sixteen counter 134. A reset signal may be used to clear the value stored in the counter 136. The SET push button 100 generates a signal received by a modulo-six counter 140 which, in turn, generates a signal on signal lines 142 representative of the quantity of logic transitions generated by an operator depressing the SET push button. Signal lines 138 and 142 are combined in an AND circuit 148 which generates a DONE signal indicative of a correspondence between the signals 138 and 142. The DONE signal is used to cause the electric motor within the bulk loading apparatus to stop rotation, the quantity of tape loaded into the cassette matching the quantity of tape desired.

Figure 6:
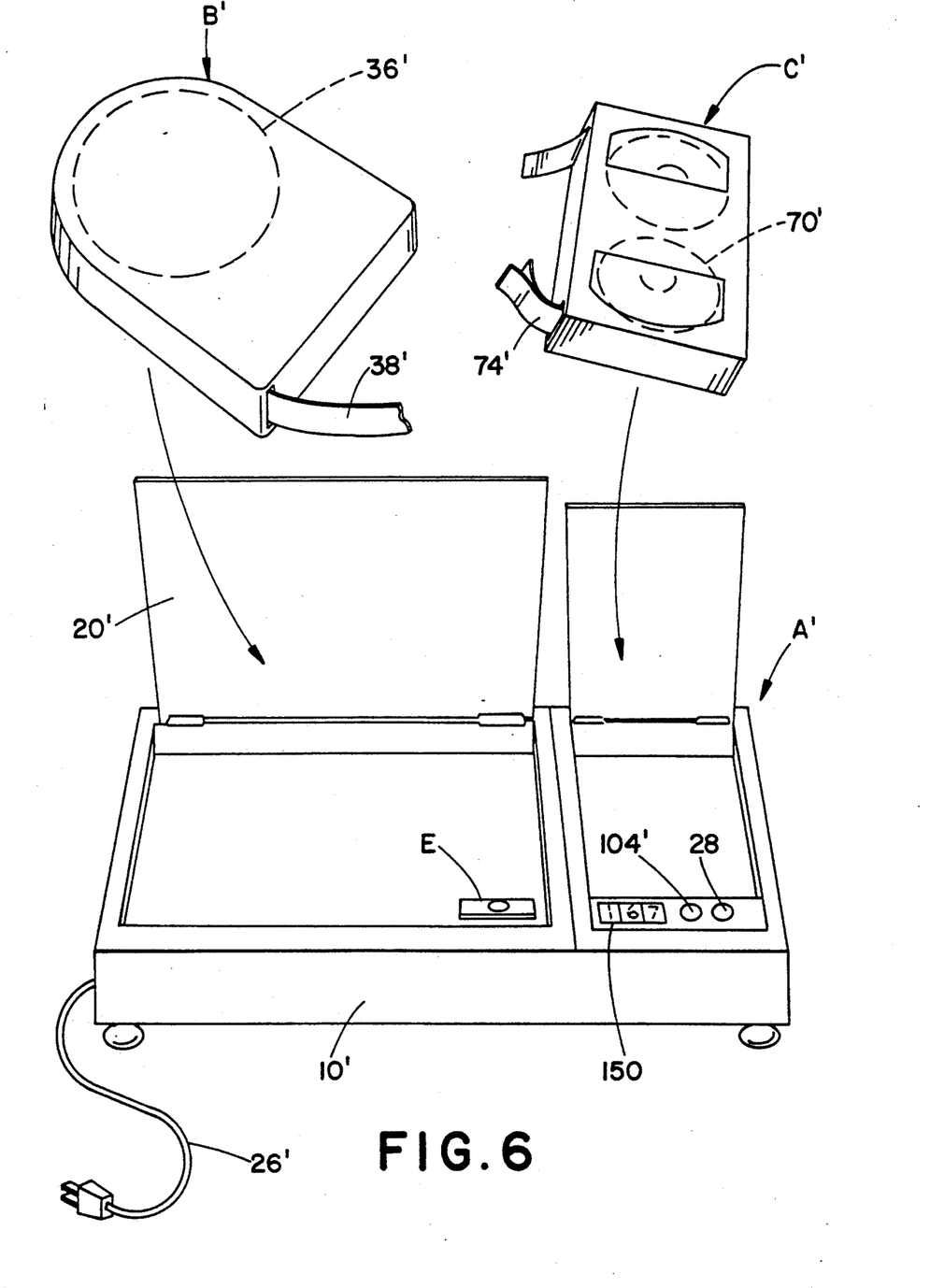
FIG. 6 is an isometric view of an alternative embodiment of the bulk magnetic tape loading apparatus for receiving the bulk magnetic tape cartridge and video cassette; and, FIG. 7 is a schematic detail view of the operative mechanisms of the embodiment shown in FIG. 6.
Figure 7:
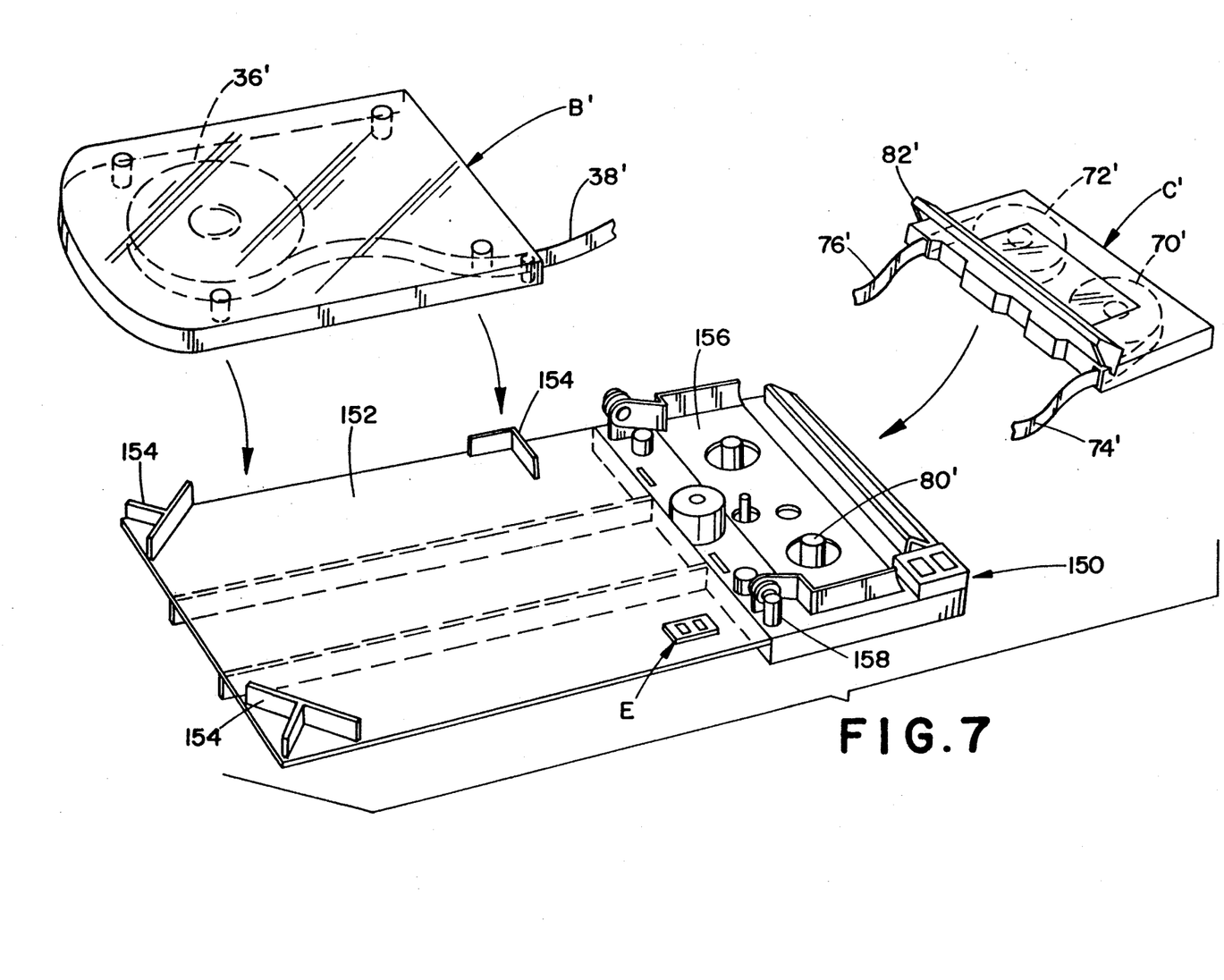
Figure 8A:
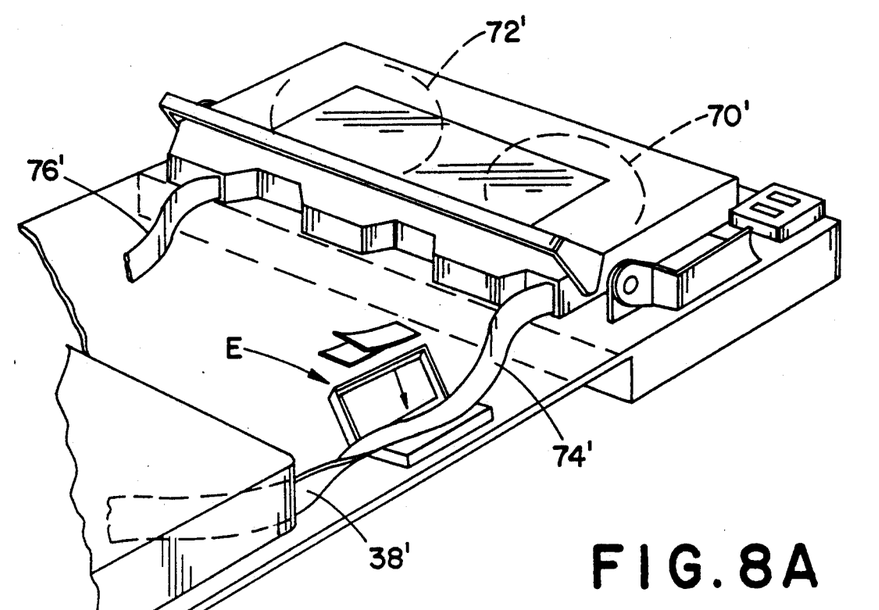
Figure 8B:
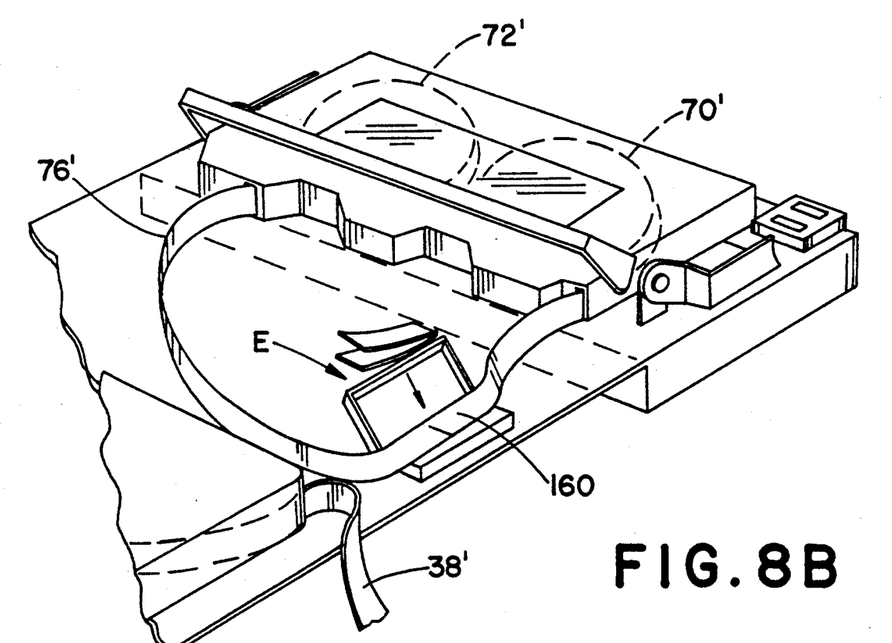

FIGS. 6–8 show a second preferred embodiment of the bulk magnetic tape loading apparatus of the present invention. For ease of illustration and discussion, like elements will be referred to by like numerals with a primed (') suffix, and new elements will be referred to by new numerals A housing 10' is provided having a bulk tape cartridge access door 20' shown in an opened position A bulk video cartridge B' having bulk tape 36' is received into the housing for loading onto a cassette C'. The bulk tape has a bulk tape end 38' for attachment to the tape leader 74' by a peel-away adhesive.

A digital counter 150 is provided to reflect the quantity of tape loaded onto the cassette. The counter may implement an LED and photo transistor arrangement as described above with respect to the first embodiment or may be the mechanical geared counter 150 driven by the spool 70'. An operator depresses the RUN push button 104' causing the electric motor within the bulk tape loading apparatus to feed the bulk tape onto the cassette and causing the digital counter 100 to increment. Alternatively, an operator may rotate a hand crank (not shown) causing the feed spool to rotate to wind the tape and to increment the mechanical digital counter 150.

A splice/cut-off mechanism E is provided for assisting an operator with the attachment of the magnetic tape 51 to the adhesive portion of the feed spool leader. The splice/cut-off mechanism E is provided with a guillotine for cutting the bulk tape 36' and is also provided with guides for aligning the leaders 74', 76' with the bulk tape for attachment using the peel-away adhesive.

In FIG. 7, a skeletal view of the operative components of the embodiment of FIG. 6 is shown. The bulk tape cartridge B' is received onto a deck portion 152 of the housing. The cartridge is located by centering positioners 154 to provide alignment between the cartridge and the cassette. The cassette C' is likewise loaded onto a cassette deck portion 156 of the housing. When inserted, the spool 70' of the cassette selectively engages the drive shaft 80'. In the orientation shown in FIG. 7, the bulk tape is directly fed into the cassette through a fixed roller guide 158.

The cassette is received onto the housing deck portion 156. The cassette bracket 82' is shown in an opened position with the spool tape leader 74' and the take-up spool tape leader 76' extending from the cassette. FIG. 8A illustrates the splice/cut-off mechanism E. in use as an alignment tool for aligning the bulk tape end 38' with the tape leader. After successful loading of the bulk tape onto the cassette, the splice/cut-off mechanism may be similarly used to align the trailing bulk tape end 160 for attachment to the take-up spool tape leader 74'.

The invention has been described with reference to the preferred embodiments. Modification and alterations will occur to others upon reading and understanding of this specification. It is my intention to include all such modifications and alterations insofar as they come within the scope of the appended claims or equivalents thereof.

Having thus described the invention, I now claim:

1. An apparatus for loading bulk magnetic tape from a bulk cartridge into a cassette having a tape leader attached to a rotatable reel, the apparatus comprising:
    a housing adapted to receive the cartridge and cassette thereon, the housing including (i) a cassette stage means formed by the housing for closely receiving the cassette at a first position allowing for a first leader to extend in a first direction from an opening in the cassette and (ii) a cartridge stage means formed by the housing for closely receiving the bulk cartridge at a second position allowing for an end of the bulk magnetic tape to extend from an opening int eh cartridge in a second direction substantially in parallel alignment with the first direction;
    driving means for selectively engaging the rotatable reel when the cassette is received on the housing; and,
    monitoring means for monitoring the amount of bulk magnetic tape loaded/fed into the cassette, the monitoring means comprising
    tape tracking means for tracking progression of the bulk magnetic tape when spliced with said tape leader and spooled onto the rotatable reel as the reel rotates;
    light generating means on the housing for generating a light beam;
    light intercepting means connected to the tape tracking means for intercepting the light beam and generating a periodic light beam as the tape tracking means tracks the progression of the bulk magnetic tape;
    optoelectronic receiver means on the housing for receiving the periodic light beam and converting the received periodic light beam into an electronic signal; and,
    counter means on the housing and responsive to the electronic signal for counting said amount of the bulk tape loaded.

2. The apparatus of claim 1 further comprising means operatively associated with the driving means for urging the reel into rotational motion responsive to a start command signal.

3. The apparatus of claim 2 further comprising follower means in contact with the tape for tracking advancement of the magnetic tape when spliced with the tape leader and spooled onto the reel as the reel rotates.

4. The apparatus of claim 3 further comprising control means for generating and sustaining the start command signal until the monitoring means reaches a first predetermined value.

5. The apparatus of claim 1 further comprising means attached to the housing for cutting the magnetic tape outside the cartridge.

6. The apparatus of claim 5 further comprising splice stage means for gripping and aligning an end of the magnetic tape outside the cartridge with an end of the tape leader.

7. An apparatus for loading magnetic tape from a magnetic tape cartridge onto a magnetic tape cassette having a first leader attached to a first rotatable reel and a second leader attached to a second rotatable reel, the apparatus comprising:
    a housing;
    cassette stage means formed by the housing for closely receiving the magnetic tape cassette at a first position allowing for the first and second leaders to extend in a first direction from an opening in the cassette;
    first stage means formed by the housing for closely receiving the magnetic tape cartridge at a second position allowing for an end of the magnetic tape to extend from an opening int eh cartridge in a second direction substantially in parallel alignment with the first direction;
    drive means for selectively engaging the first rotatable reel when the cassette is in the first position;
    motivation means, connected to the drive means, for urging the first rotatable reel into rotational motion when the drive means is engaged; p1 follower means for tracking progression of the magnetic tape when spliced with the first leader and spooled onto the first rotatable reel as the reel rotates; and,
    optoelectronic counter means, responsive to the follower means, for counting a quantity of the bulk tape loaded as an incremental value.

8. The apparatus of claim 7 further comprising means for generating a loaded tape quantity signal.

9. The apparatus of claim 7 wherein said motivation means comprises an electric motor means for urging the first rotatable reel into rotational motion responsive to a START command signal.

10. The apparatus of claim 9 further comprising control means for generating and sustaining the START command signal until the counter means reaches a first predetermined value.

11. The apparatus of claim 9 further comprising second drive means for engaging the second rotatable reel when the cassette is in the first position.

12. The apparatus of claim 7 further comprising tensioning means for tensioning the magnetic tape during progression of the tape from the first reel to the second reel when spliced with the second leader and spooled onto the second reel as the second drive means rotates.

13. The apparatus of claim 10 further comprising means for urging the first rotatable reel into rotational motion responsive to a JOG command signal.

14. The apparatus of claim 13 wherein the control means comprises means for generating the JOG command signal responsive to an external JOG command from an operator.

15. The apparatus of claim 14 wherein the control means further comprises RUN signal input means for inputting an external RUN command form an operator to generate the START command signal.

16. The apparatus of claim 15 wherein the control means further comprises JOG signal input means for inputting said external JOG command from said operator to generate the JOG command signal.

17. The apparatus of claim 10 wherein the control means further comprises SET signal input means for inputting an external SET command from an operator.

18. The apparatus of claim 17 wherein the control means further comprises first control counter means for counting a number of SET commands inputted as a first control count value, and for generating a first control count value signal.

19. The apparatus of claim 18 wherein the control means further comprises first logic means, connected to the first control count value signal, for generating a DONE command signal when said incremental value and the first control count value match.

20. The apparatus of claim 19 wherein the control means further comprises second logic means for removing the START command signal when the DONE command signal is generated.

21. The apparatus of claim 20 wherein said optoelectronic counter means comprises:
light generating means on the housing for generating a light beam;
light intercepting means connected to said follower means to intercepting the light beam and producing a periodic light beam as the follower means tracks the progression of the magnetic tape;
receiver means on the housing for receiving the periodic light beam and converting the received periodic light beam into an electronic signal; and,
means on the housing and responsive to the electronic signal for counting said quantity of the bulk tape loaded as said incremental value.

22. The apparatus of claim 21 wherein said light intercepting means comprises a rotatable member having at least one opening for periodically passing the light beam therethrough as the member rotates while said follower means tracks said progression of the magnetic tape.

23. The apparatus of claim 22 wherein said first stage means includes means for closely receiving the magnetic tape cartridge at said second position allowing for the end of the magnetic tape to extend from the opening in the cartridge in said first direction substantially in parallel alignment with the first and second leaders.

24. The apparatus of claim 7 wherein said optoelectronic counter means comprises:
light generating means on the housing for generating a light beam;
light intercepting means connected to said follower means for intercepting the light beam and producing a periodic light beam as the follower means tracks the progression of the magnetic tape;
phototransistor receiver means on the housing for receiving the periodic light beam and converting the received periodic light beam into a periodic electronic signal; and,
means on the housing and responsive to the periodic electronic signal for counting said quantity of the bulk tape loaded as said incremental value.

25. The apparatus of claim 24 wherein said light intercepting means comprises a rotatable tracking member having at least one opening for rotating with the tracking of the follower means and periodically passing the light beam therethrough as the member rotates.

26. The apparatus of claim 25 wherein said first stage means includes means for closely receiving the magnetic tape cartridge at said second position allowing for the end of the magnetic tape to extend from the opening in the cartridge in said first direction substantially in parallel alignment with the first and second leaders.

27. An apparatus for loading magnetic tape from a magnetic tape cartridge onto a magnetic tape cassette having a first leader attached to a first rotatable reel and a second leader attached to a second rotatable reel, the apparatus comprising:
a housing;
cassette stage means formed by the housing for closely receiving the magnetic tape cassette at a first position allowing for the first and second leaders to extend in a first direction from an opening in the cassette;
first stage means formed by the housing for closely receiving the magnetic tape cartridge at a second position with an end of the magnetic tape extending from the cartridge substantially in parallel alignment with the first direction;
drive means for selectively engaging the first rotatable reel when the cassette is in the first position;
motivation means, connected to the drive means, for urging the first rotatable reel into rotational motion when the drive means is engaged;
follower means for tracking progression of the magnetic tape when spliced with the first leader and spooled onto the first rotatable reel as the reel rotates;
light generating means on the housing for generating a light beam;
light intercepting means connected to the follower means for intercepting the light beam and generating a periodic light beam as the follower means tracks the progression of the magnetic tape;
receiver means on the housing for receiving the periodic light beam and converting the received periodic light beam into an electric signal; and,
counter means on the housing and responsive to the electric signal for counting a quantity of the bulk tape loaded as an incremental value.

28. The apparatus of claim 27 wherein the light intercepting means comprises means for periodically intercepting the light beam.

29. The apparatus of claim 28 wherein the light intercepting means comprises a rotatable tracking member connected to the follower means and having at least one opening for periodically passing the light beam therethrough as the member rotates with said tape progression.

30. The apparatus according to claim 29 wherein said first stage means includes means for closely receiving the magnetic tape cartridge at said second position with the end of the magnetic tape extending from the opening in the cartridge in said first direction substantially in parallel alignment with the first and second leaders.

* * * * *